United States Patent
Chang

(10) Patent No.: US 9,114,750 B2
(45) Date of Patent: Aug. 25, 2015

(54) HAND PULLER WITH ROPE REEL

(71) Applicant: Win Chance Metal Co., Ltd., Changhua, Changhua County (TW)

(72) Inventor: Wen Cheng Chang, Changhua (TW)

(73) Assignee: Win Chance Metal Co., Ltd., Changhua (TW)

( * ) Notice: Subject to any disclaimer, the term of this patent is extended or adjusted under 35 U.S.C. 154(b) by 0 days.

(21) Appl. No.: 14/095,047

(22) Filed: Dec. 3, 2013

(65) Prior Publication Data
US 2015/0151664 A1 Jun. 4, 2015

(51) Int. Cl.
*B21F 9/00* (2006.01)
*B66F 3/00* (2006.01)
*B60P 7/08* (2006.01)

(52) U.S. Cl.
CPC .............. *B60P 7/0846* (2013.01); *B60P 7/083* (2013.01)

(58) Field of Classification Search
CPC .............. B66D 1/02; B66D 1/04; B66D 1/24; B66D 1/26; B66D 3/02; B66D 3/14; B66D 5/34; B65H 75/4457
USPC .......................................... 254/218, 219, 239
See application file for complete search history.

(56) References Cited

U.S. PATENT DOCUMENTS

| | | | | |
|---|---|---|---|---|
| 470,544 A * | 3/1892 | Cochran | ........................ | 254/219 |
| 485,515 A * | 11/1892 | Uhlig | ............................... | 74/333 |
| 691,521 A * | 1/1902 | Bandemer | ....................... | 254/214 |
| 2,630,298 A * | 3/1953 | Hoehn | ........................... | 254/366 |
| 2,809,804 A * | 10/1957 | Sheard | ........................ | 242/157.1 |
| 3,005,621 A * | 10/1961 | Johnson et al. | ................ | 254/376 |
| 3,765,651 A * | 10/1973 | Lifferth | .......................... | 254/342 |
| 5,344,121 A * | 9/1994 | Baziuk | ........................... | 254/358 |
| 5,611,520 A * | 3/1997 | Soderstrom | .................... | 254/218 |
| 6,431,525 B1 * | 8/2002 | Roll | ............................... | 254/357 |
| 7,484,713 B1 * | 2/2009 | Young | ............................ | 254/342 |
| 7,861,382 B1 * | 1/2011 | Madachy et al. | ........... | 24/68 CD |
| 2005/0133770 A1 * | 6/2005 | Dow | ............................... | 254/218 |
| 2006/0180800 A1 * | 8/2006 | Tremblay | ...................... | 254/229 |
| 2007/0122247 A1 * | 5/2007 | Madachy et al. | .............. | 410/100 |
| 2010/0133372 A1 * | 6/2010 | Ying | ............................... | 242/395 |
| 2014/0070152 A1 * | 3/2014 | Bond | ............................ | 254/222 |
| 2014/0246533 A1 * | 9/2014 | Huang | ........................... | 242/379 |

* cited by examiner

*Primary Examiner* — Emmanuel M Marcelo
(74) *Attorney, Agent, or Firm* — Alan D. Kamrath; Kamrath IP Lawfirm, P.A.

(57) ABSTRACT

A hand puller with a rope reel contains a body and a reel. The body includes a fixing holder, a first rotary shaft, a rotating handle, two ratchet wheels, and at least one stopping piece. The rotating handle having a pushing plate, and the first rotary shaft has two driving gears. The reel includes a seat, a second rotary shaft, two driven gears, and a chain roller. The body includes a first connecting portion with plural holes, and the seat has a second connecting portion and a plurality of apertures. The reel and the body are movably coupled together, and the second connecting portion of the reel is aligned and overlapped with the first connecting portion of the body. At least one pin is inserted into at least one of the plural holes of the first connecting portion and the plurality of apertures of the second connecting portion.

6 Claims, 13 Drawing Sheets

HAND PULLER WITH ROPE REEL

BACKGROUND OF THE INVENTION

1. Field of the Invention

The present invention relates to a hand puller and, more particularly, to a reel for a hand puller to roll a chain or a steel cable.

2. Description of the Prior Art

With reference to FIGS. 1 and 2, a conventional hand puller contains a fixing holder 10, a rotating handle 20, and a shaft 30 pivoted between the fixing holder 10 and the rotating handle 20. Two ends of the shaft 30 are fitted through two ratchet wheels 40. The fixing holder 10 has two stopping pieces 101 retained with the two ratchet wheels 40 to generate a single direction stopping function and has a positioning post 102 for inserting a short rope 50. The rotating handle 20 has a pushing plate 201 mounted thereon and retained with the two ratchet wheels 40 to drive the two ratchet wheels 40 and the shaft 30 to rotate. The shaft 30 has a through hole 301 defined thereon to insert a long rope 60. In use, the rotating handle 20 is rotated relative to the fixing holder 10, and the shaft 30 is driven by the rotating handle 20 to roll the long rope 60. The two stopping pieces 101 of the fixing holder 10 retain with the two ratchet wheels 40, thereby pulling the long rope 60 tightly to bundle goods.

Intending to pull the long rope 60 to surround the goods, the rotating handle 20 is rotated to roll and pull the long rope 60 tightly, thus tying the goods securely. However, the long rope 60 is knitted to obtain flexibility and tensile strength, so it is only applicable for common goods. When desiring to pull the goods more strongly, another hand puller is applied to pull a chain or a steel cable, thus limiting usage.

The present invention has arisen to mitigate and/or obviate the afore-described disadvantages.

SUMMARY OF THE INVENTION

The primary objective of the present invention is to provide a hand puller with a rope reel in which a body is used solely. A rope is inserted through and is tied on a through orifice of a first rotary shaft, and the rotating handle is rotated to roll and tighten the rope, thus bundling goods.

Another objective of the present invention is to provide a hand puller with a rope reel in which a reel is moveably coupled with the body, so that two driven gears of the reel mesh with two driving gears of the body. Hence, the body is rotated to roll the chain or the steel cable effectively.

To obtain the above objectives, a hand puller with a rope reel provided by the present invention contains: a body and a reel.

The body includes a fixing holder, a first rotary shaft inserted into the fixing holder, a rotating handle pivoted with the fixing holder, two ratchet wheels mounted on two ends of the first rotary shaft, and at least one stopping piece disposed on the fixing holder and pushed to retain with the two ratchet wheels to generate a single-direction stopping function.

The rotating handle has a pushing plate retained with the two ratchet wheels by rotating the rotating handle to rotate the two ratchet wheels and the first rotary shaft, and the first rotary shaft has two driving gears fixed on two ends thereof.

The reel includes a seat movably coupled with the body, a second rotary shaft inserted through the seat, two driven gears meshing with the two driving gears, and a chain roller or a steel cable roller mounted on the seat.

The body includes a first connecting portion with plural holes. The seat has a second connecting portion disposed thereon and has a plurality of apertures defined on the second connecting portion thereof. The reel and the body are movably coupled together. The second connecting portion of the reel is aligned and overlapped with the first connecting portion of the body, and at least one pin is inserted into at least one opening of the first connecting portion and the plurality of aperturqs of the second connecting portion.

DETAILED DESCRIPTION OF THE PREFERRED EMBODIMENTS

Figure 1:
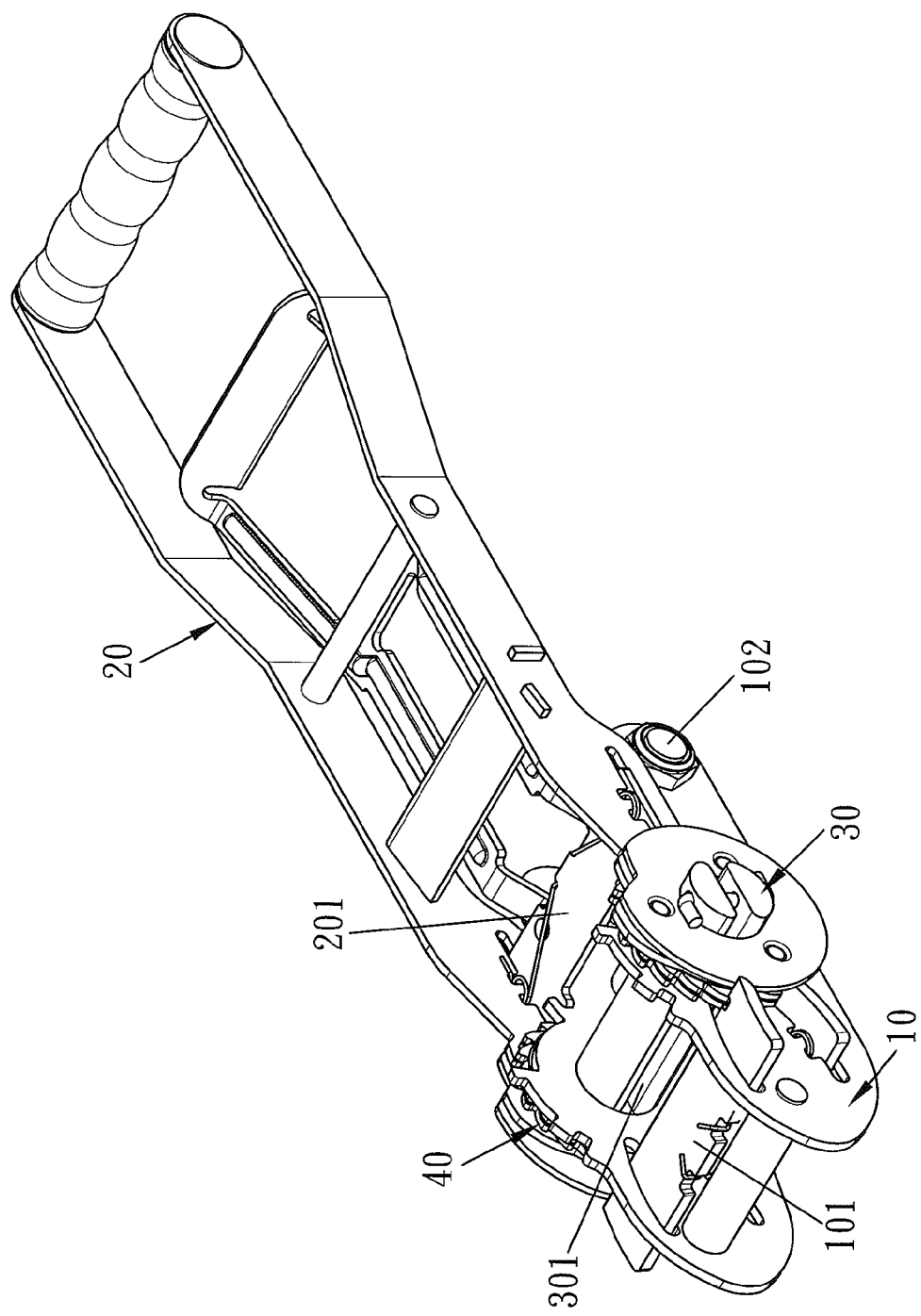
FIG. 1 is a perspective view of a conventional hand puller.
Figure 2:
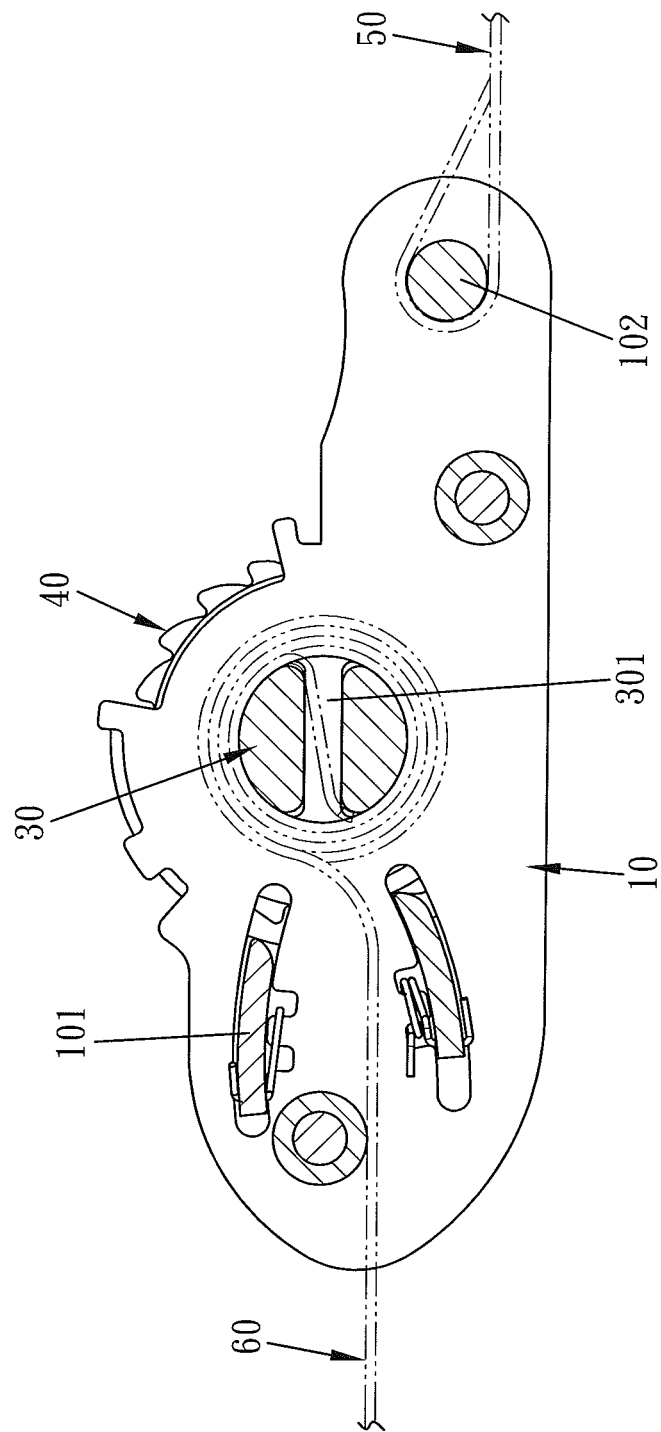
FIG. 2 is a cross sectional view showing the application of the conventional hand puller.
Figure 3:
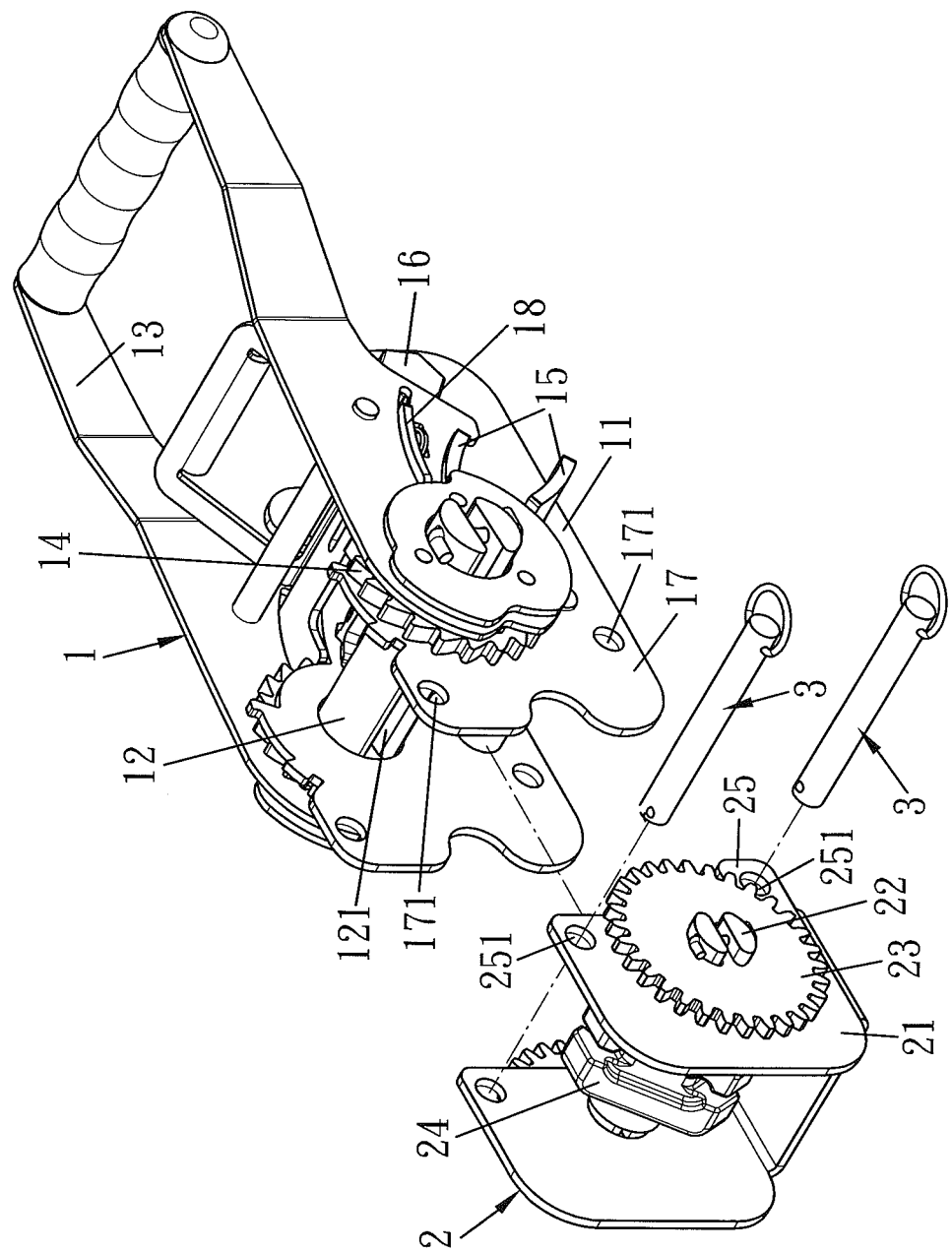
FIG. 3 is a perspective view showing the exploded components of a hand puller with a rope reel according to a first embodiment of the present invention.
Figure 4:
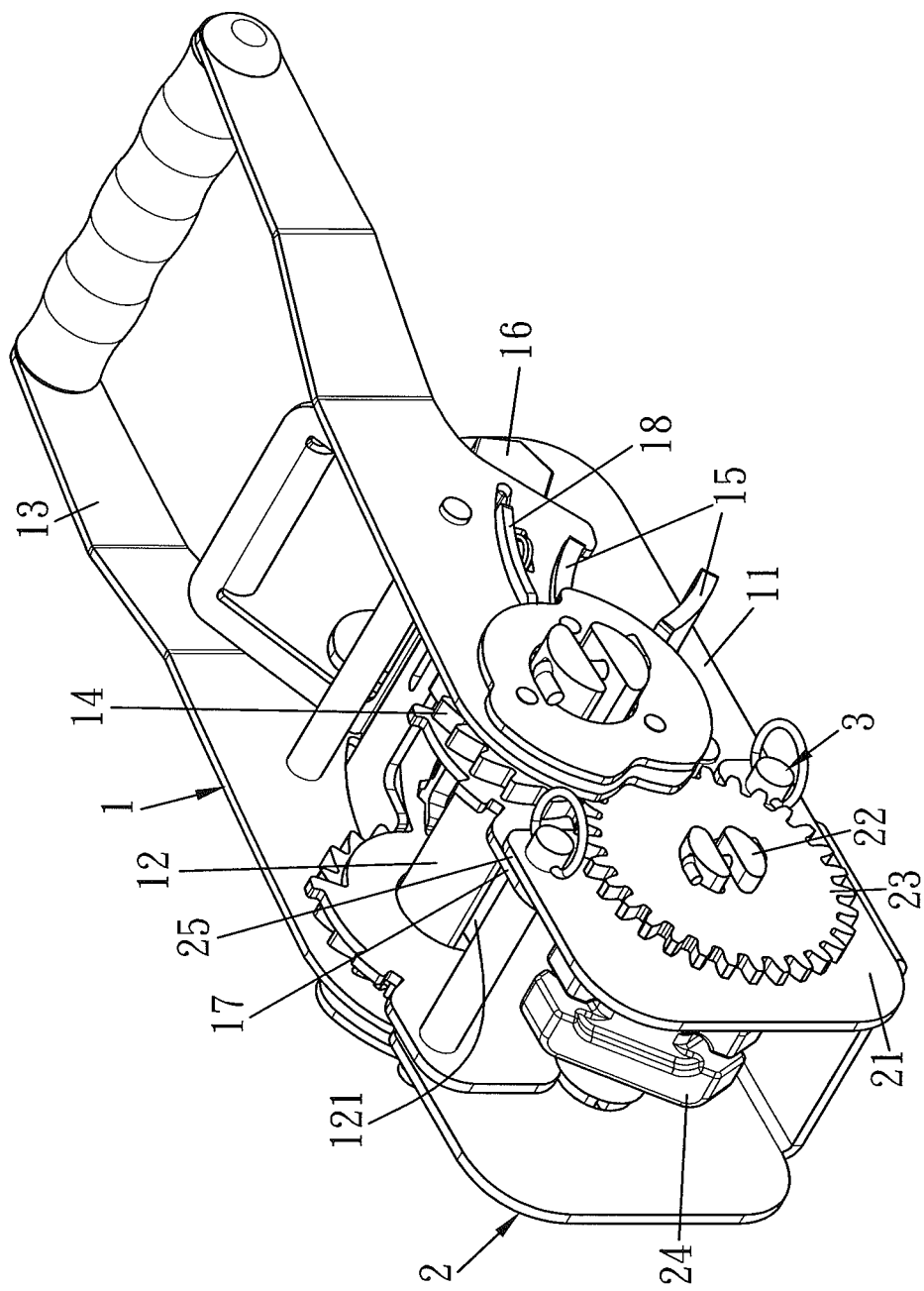
FIG. 4 is a perspective view showing the assembly of the hand puller with the rope reel according to the first embodiment of the present invention.
Figure 5:
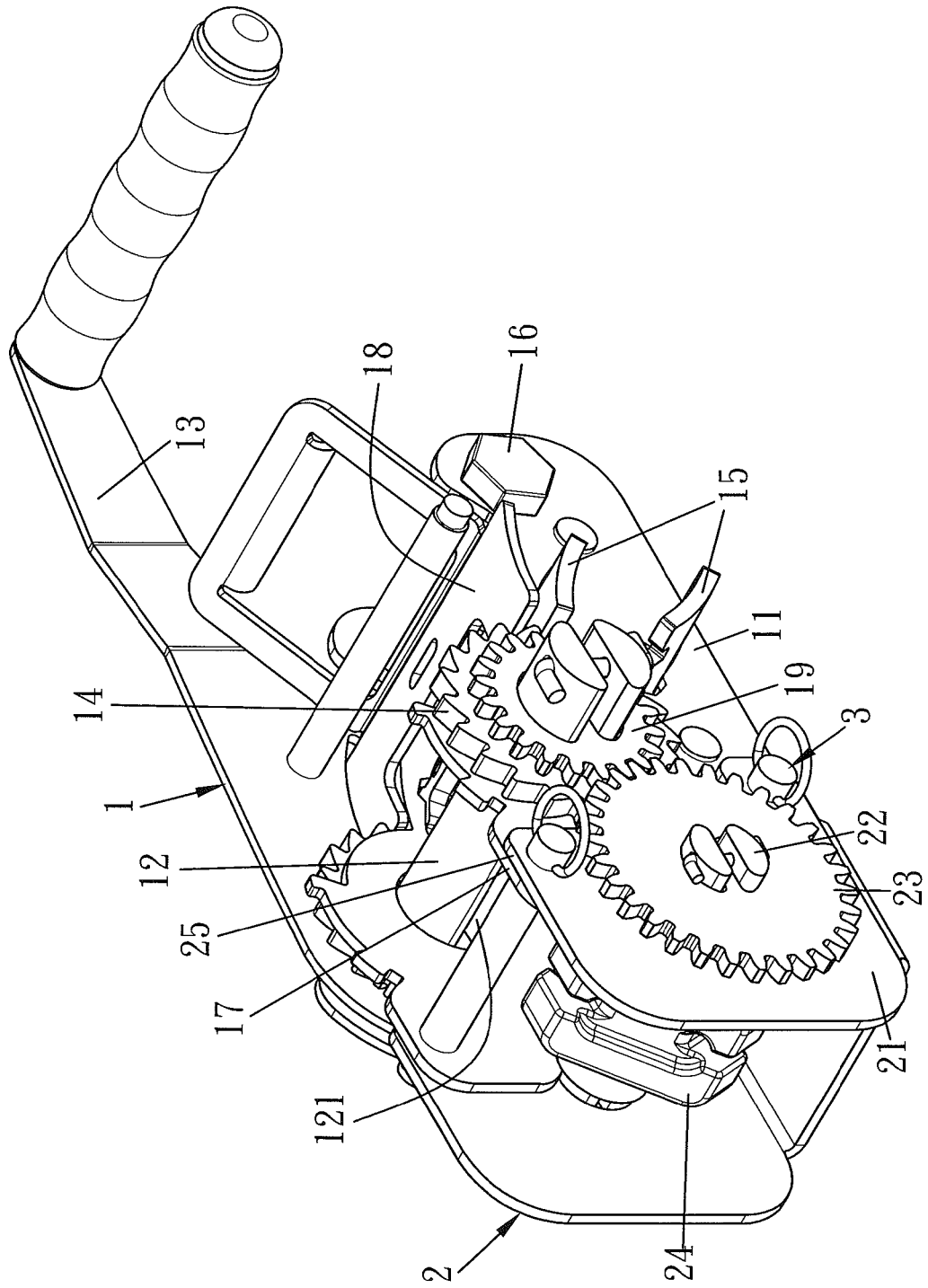
FIG. 5 is a perspective view showing the assembly of a part of the hand puller with the rope reel according to the first embodiment of the present invention.
Figure 6:
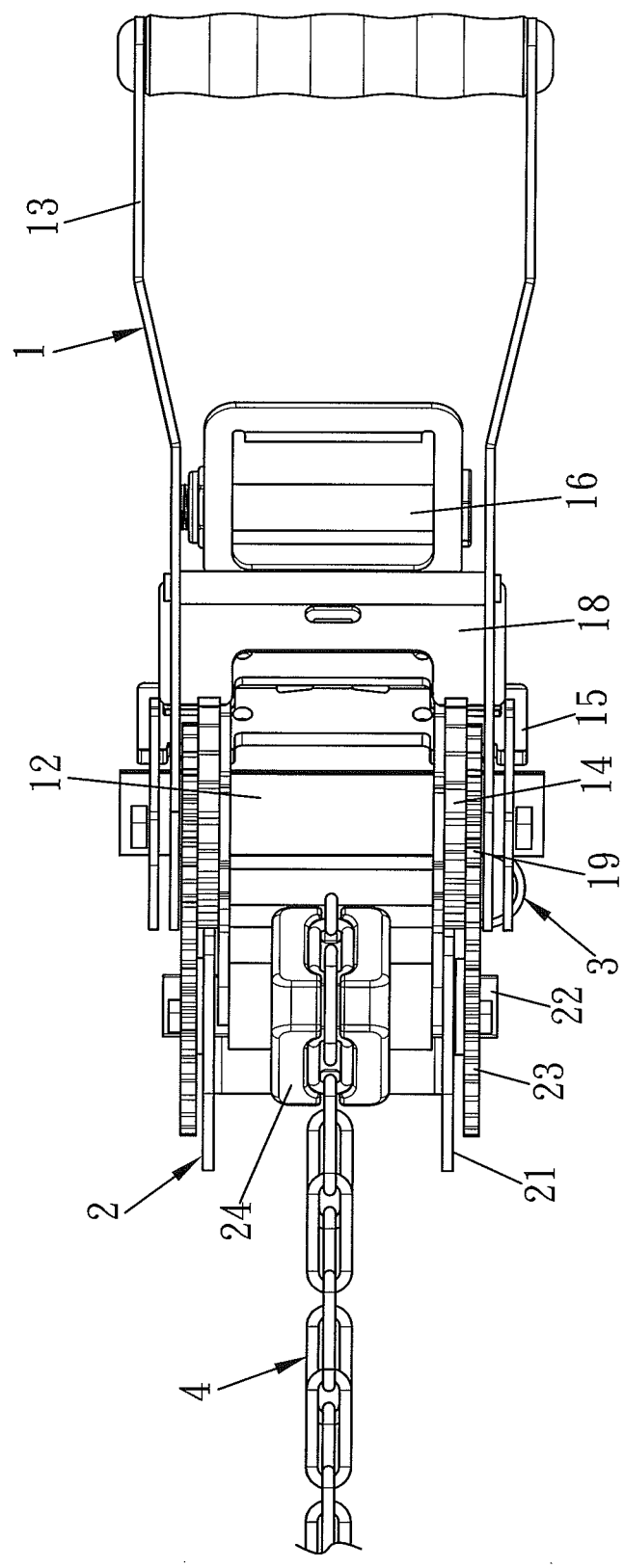
FIG. 6 is a top plan view showing the operation of the hand puller with the rope reel according to the first embodiment of the present invention.
Figure 7:
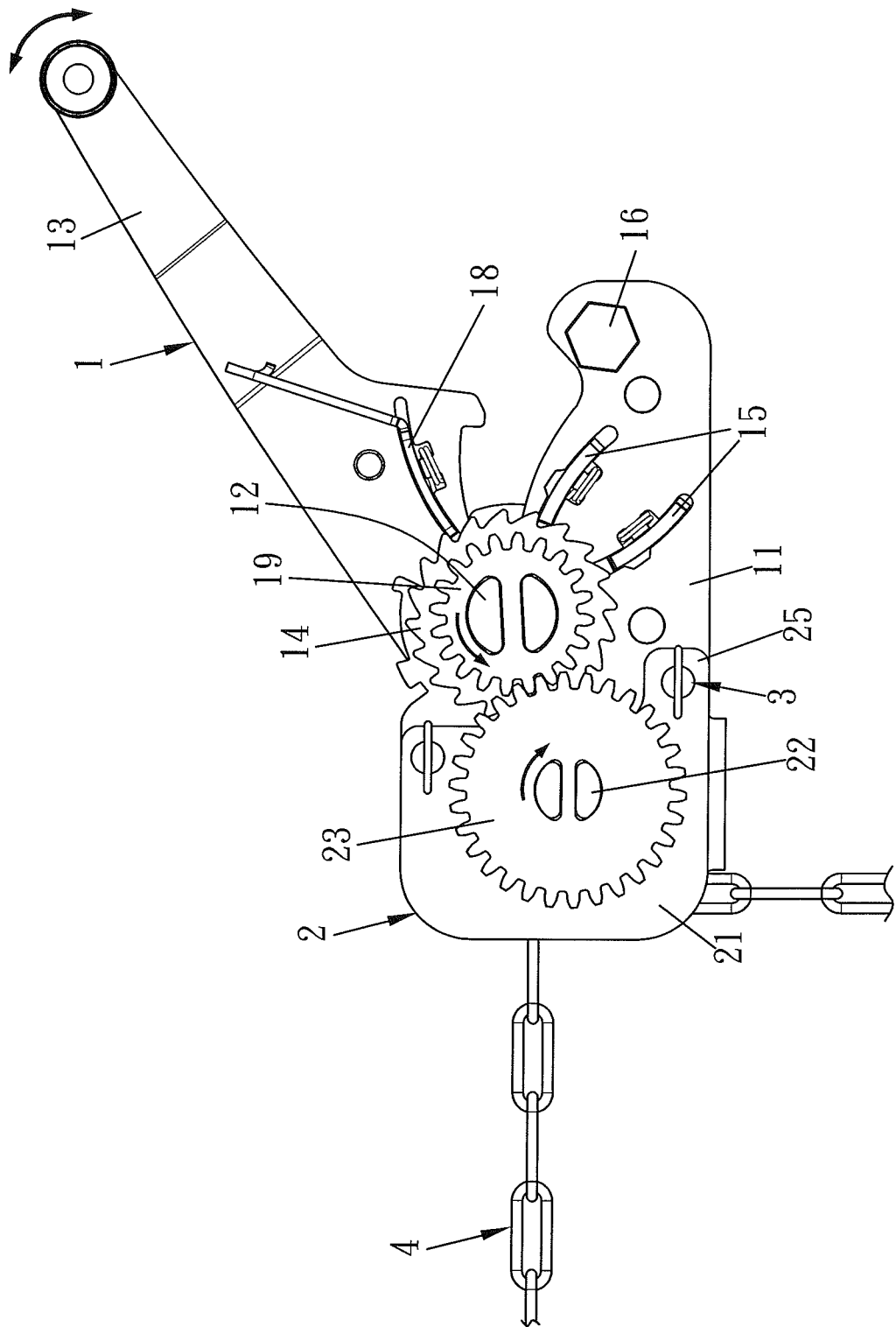
FIG. 7 is a side plan view showing the operation of the hand puller with the rope reel according to the first embodiment of the present invention.

The present invention will be clearer from the following description when viewed together with the accompanying drawings, which show, for purpose of illustration only, embodiments in accordance with the present invention.

With reference to FIGS. 3-7, a hand puller with a rope reel according to a first embodiment of the present invention comprises: a body 1 and a reel 2. The body 1 includes a fixing holder 11, a first rotary shaft 12 inserted into the fixing holder 11, a rotating handle 13 pivoted with the fixing holder 11, two ratchet wheels 14 mounted on two ends of the first rotary shaft 12 outside the fixing holder 11, two stopping pieces 15 disposed on the fixing holder 11, a positioning post 16 for connecting with a locking unit, and a first connecting portion 17 with plural holes 171. Thus, when the two stopping pieces 15 are pushed to retain with the two ratchet wheels 14, thus generating a single-direction stopping function. The rotating handle 13 has a pushing plate 18 retained with the two ratchet wheels 14 by rotating the rotating handle 13 to rotate the two ratchet wheels 14 and the first rotary shaft 12. The first rotary shaft 12 has a through orifice 121 defined thereon to insert and roll a rope. The first rotary shaft 12 has two driving gears 19 fixed on two ends thereof. The reel 2 includes a seat 21, a second rotary shaft 22 inserted through the seat 21, two driven gears 23 secured on two ends of the second rotary shaft 22 outside the seat 21 and meshing with the two driving gears 19, and a chain roller 24 mounted on the second rotary shaft 22 inside the seat 21. The seat 21 has a second connecting portion 25 disposed thereon and having a plurality of apertures 251 defined on the second connecting portion 25 thereof.

In use, the fixing unit is positioned at a fixed position by ways of the positioning post 16, the rope is inserted through and is tied on the through orifice 121 of the first rotary shaft 12, and the rotating handle 13 is rotated relative to the fixing holder 11 to drive the first rotary shaft 12 to roll the rope. The two stopping pieces 15 of the fixing holder 11 retain with the two ratchet wheels 14, thus tightening the rope to bundle goods.

In use, the second connecting portion 25 of the reel 2 is aligned and overlapped with the first connecting portion 17 of the body 1, and at least one pin 3 is inserted into at least one of the plural holes 171 of the first connecting portion 17 and the plurality of apertures 251 of the second connecting portion 25. Thereafter, the reel 2 is movably coupled with the body 1. The two driven gears 23 of the reel 2 mesh with the two driving gears 19 of the body 1, so that the fixing unit is positioned at the fixed position by ways of the positioning post 16. A part of the rings of a chain 4 lock on the chain roller 24 of the reel 2. The rotating handle 13 is rotated relative to the fixing holder 11 to drive the first rotary shaft 12 to rotate, and the two driving gears 19 of the first rotary shaft 12 drive the two driven gears 23 of the second rotary shaft 22 of the reel 2. Thus, the second rotary shaft 22 and the chain roller 24 rotate simultaneously, so that the chain roller 24 rolls the chain 4.

Figure 8:
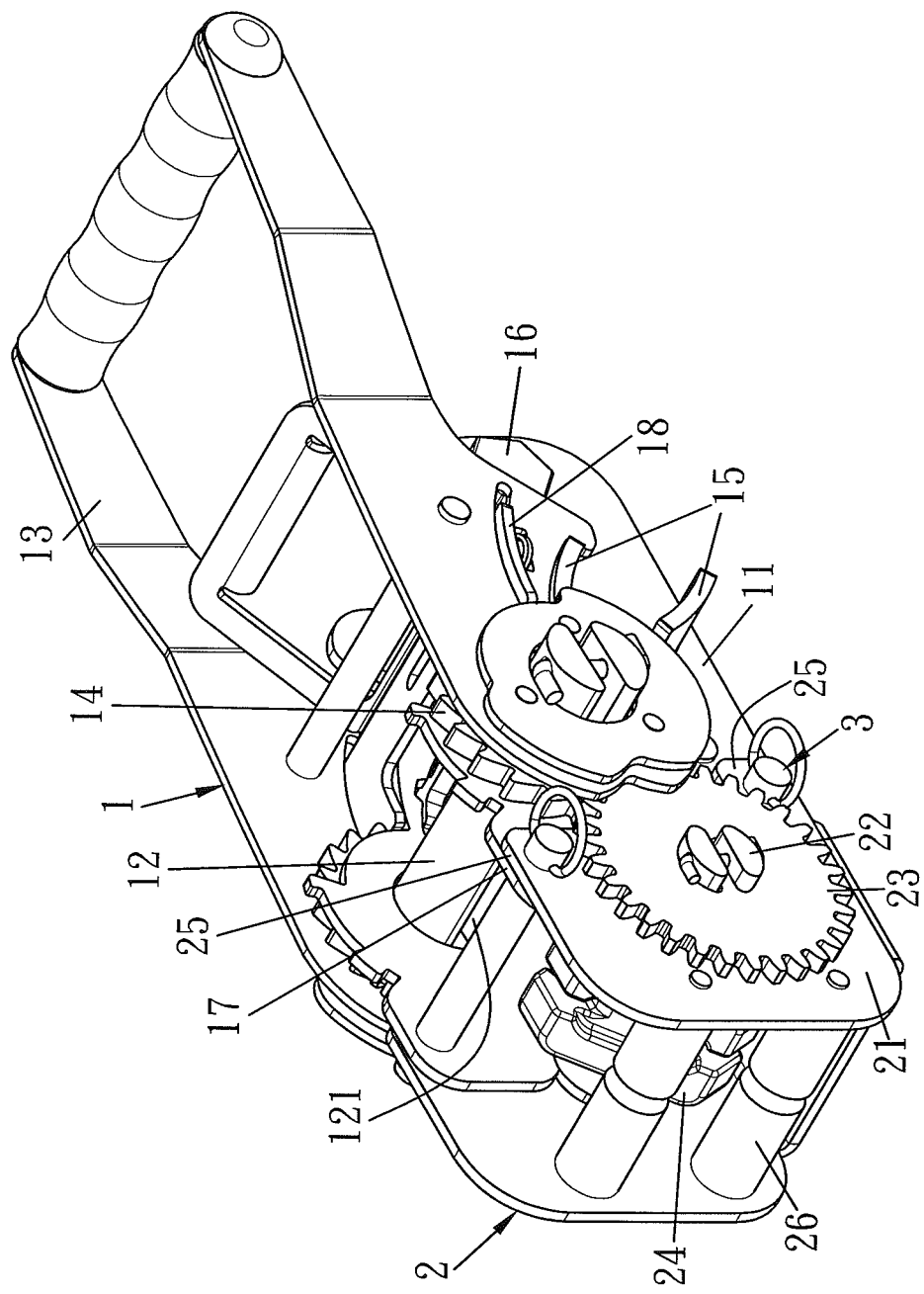
FIG. 8 is a perspective view showing a guiding device being provided on the hand puller with the rope reel according to the first embodiment of the present invention.
Figure 9:
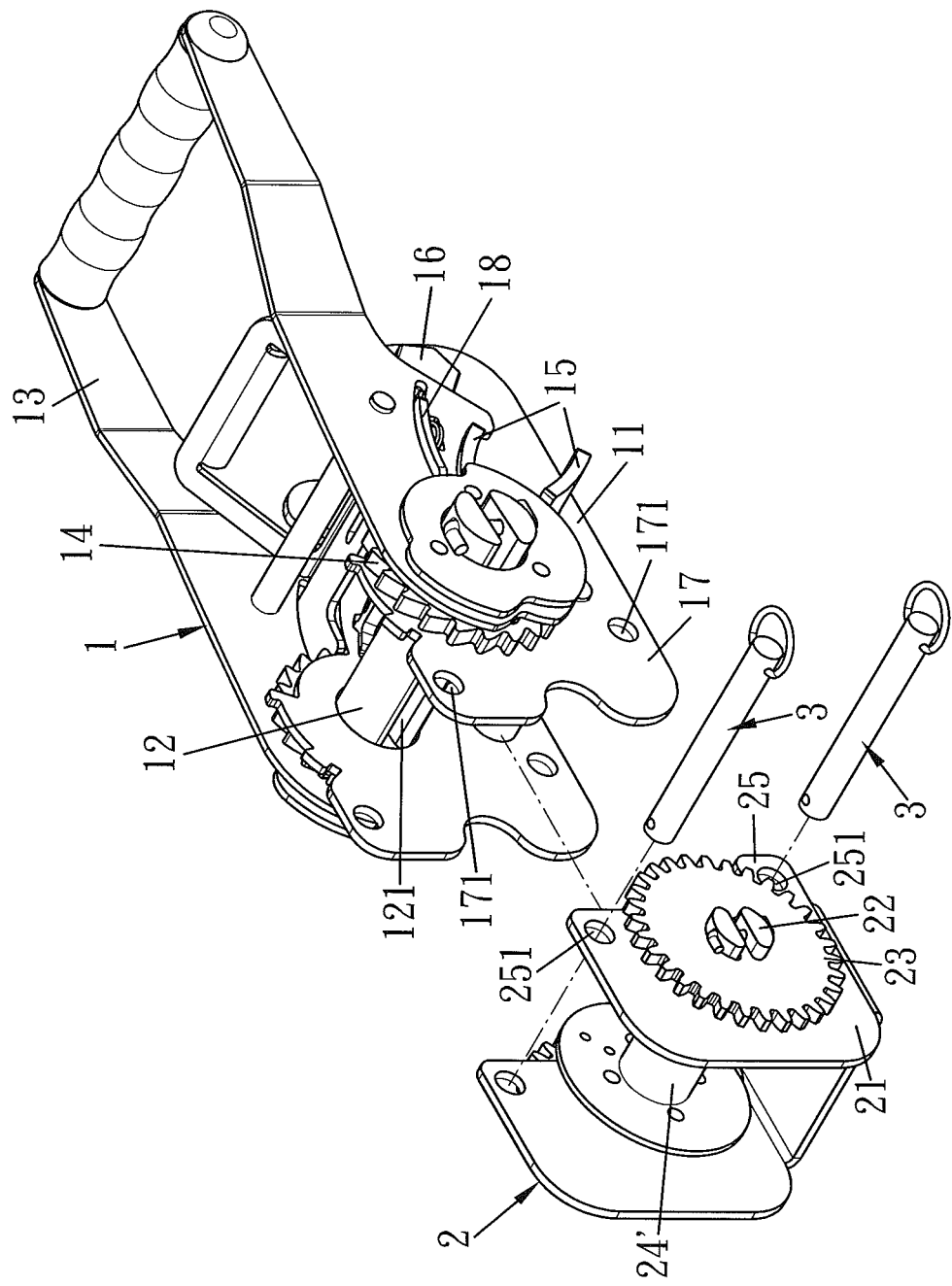
FIG. 9 is a perspective view showing the exploded components of a rope reel for the hand puller according to a second embodiment of the present invention.
Figure 10:
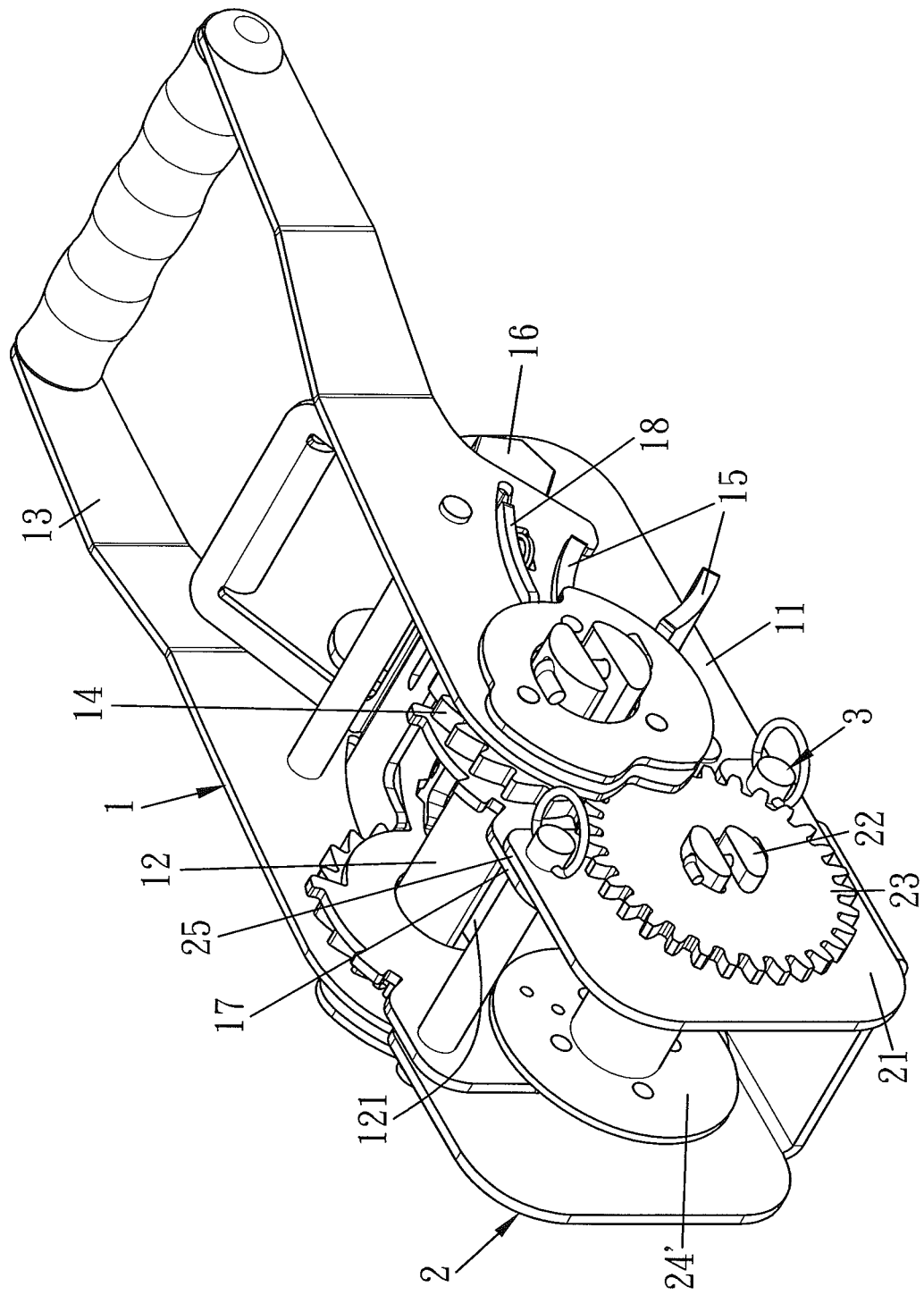
FIG. 10 is a perspective view showing the assembly of the hand puller with the rope reel according to the second embodiment of the present invention.
Figure 11:
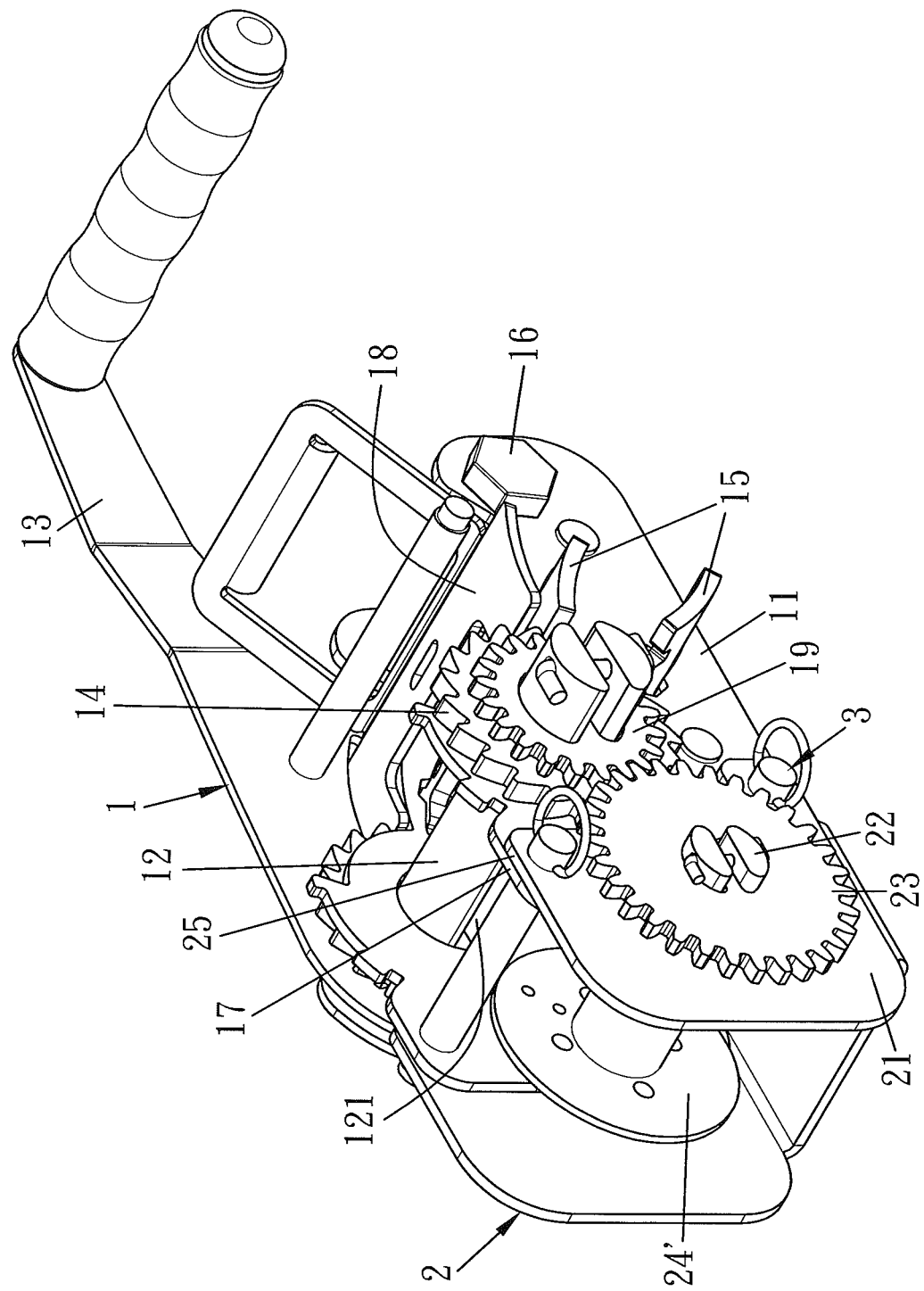
FIG. 11 is a perspective view showing the assembly of a part of the hand puller with the rope reel according to the second embodiment of the present invention.
Figure 12:
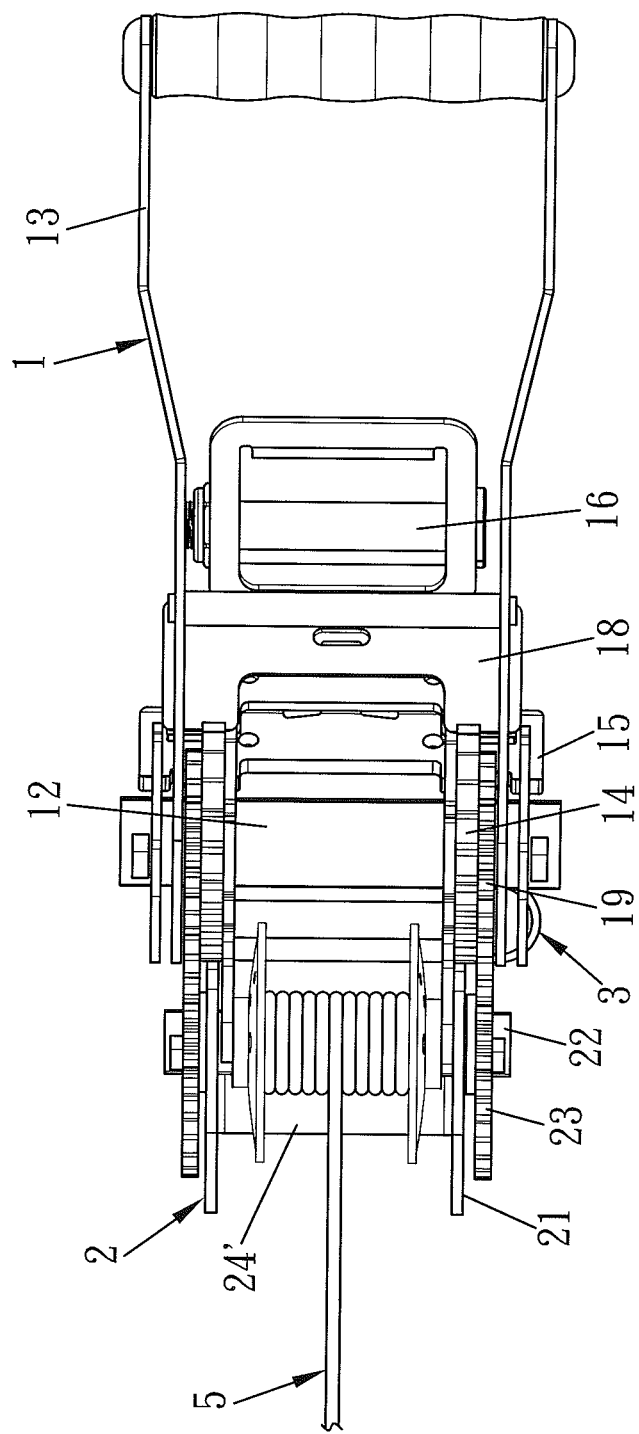
FIG. 12 is a top plan view showing the operation of the hand puller with the rope reel according to the second embodiment of the present invention.
Figure 13:
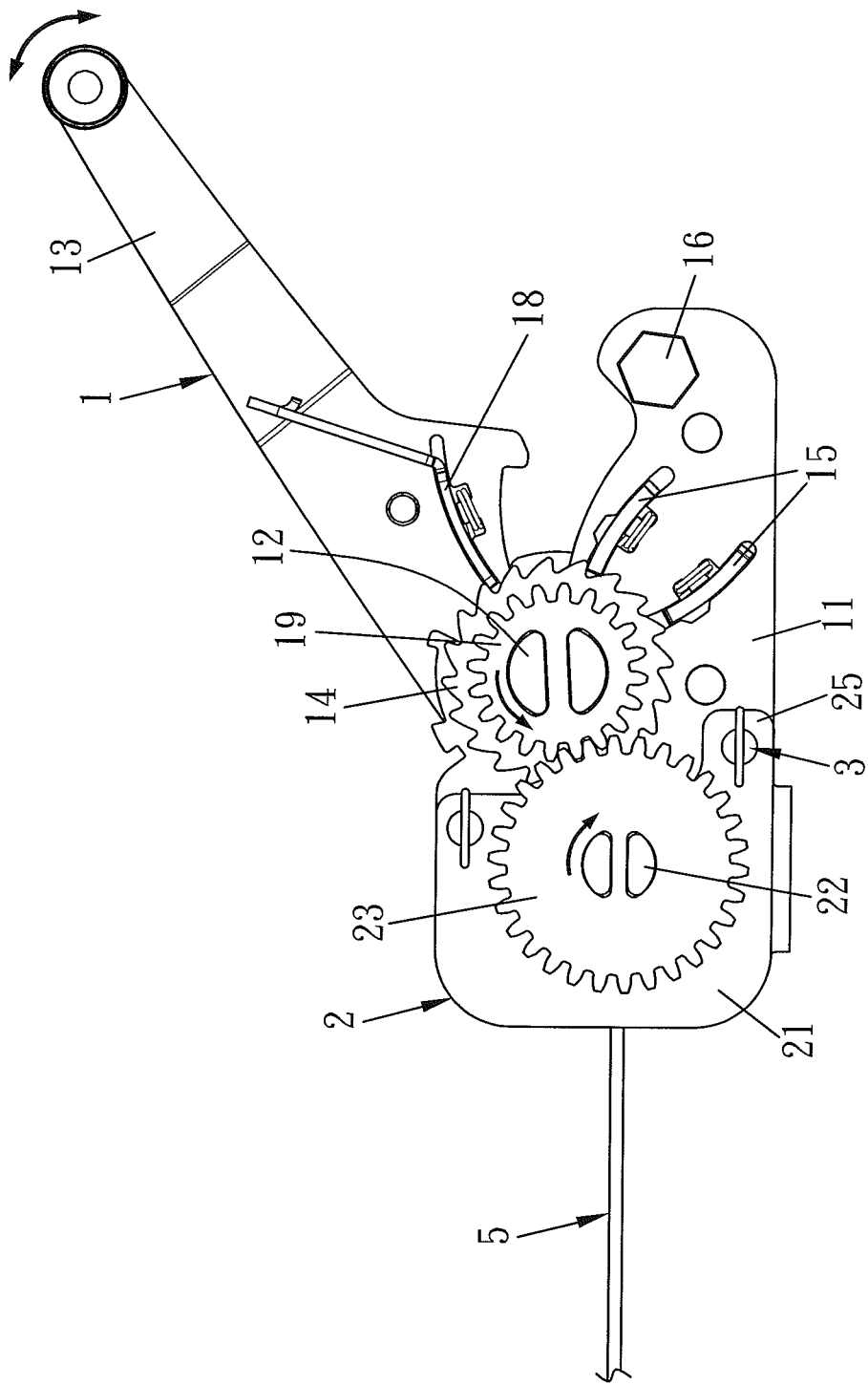
FIG. 13 is a side plan view showing the operation of the hand puller with the rope reel according to the second embodiment of the present invention.

Referring to FIG. 8, the seat 21 of the reel 2 also has a guiding device 26, so that the rings of the chain 4 retain with the chain roller 24 via the guiding device 26, and the chain roller 24 rolls the chain 4 smoothly.

With reference to FIGS. 9-13, a hand puller with a rope reel according to a second embodiment of the present invention comprises: a seat 21, a second rotary shaft 22 inserted through the seat 21, two driving gears 19 fixed on two ends of the first rotary shaft 12, two driven gears 23 secured on two ends of the second rotary shaft 22 and meshing with the two driving gears 19, and a steel cable roller 24' mounted on the second rotary shaft 22 inside the seat 21. The seat 21 has a second connecting portion 25 disposed thereon and has a plurality of apertures 251 defined on the second connecting portion 25.

In use, the second connecting portion 25 of the reel 2 is aligned and overlapped with the first connecting portion 17 of the body 1, and at least one pin 3 is inserted into at least one of the plural holes 171 of the first connecting portion 17 and the plurality of apertures 251 of the second connecting portion 25. Thereafter, the reel 2 is movably coupled with the body 1. The two driven gears 23 of the reel 2 mesh with the two driving gears 19 of the body 1, so that the fixing unit is positioned at the fixed position by ways of the positioning post 16, and a steel cable 5 of the reel 2 is rolled on a steel cable roller 24'. The rotating handle 13 is rotated relative to the fixing holder 11 to drive the first rotary shaft 12 to rotate, and the two driving gears 19 of the first rotary shaft 12 drive the two driven gears 23 on the second rotary shaft 22 of the reel 2. Thus, the second rotary shaft 22 and the steel cable roller 24' rotate simultaneously so that the steel cable roller 24' rolls the chain 4.

Thereby, the hand puller with the rope reel comprises the body 1 and the reel 2, and the body 1 can be used solely. The rope is inserted through and is tied on the through orifice 121 of the first rotary shaft 12, and the rotating handle 13 is rotated to roll and tighten the rope, thus bundling goods. In addition, the reel 2 is moveably coupled with the body 1, so that the two driven gears 23 of the reel 2 mesh with the two driving gears 19 of the body 1. Hence, the body 1 is rotated to roll the chain 4 or the steel cable 5 effectively.

While various embodiments in accordance with the present invention have been shown and described, it is clear to those skilled in the art that further embodiments may be made without departing from the scope of the present invention.

What is claimed is:

1. A hand puller with a rope reel comprising:
a body including a fixing holder, a first rotary shaft inserted into the fixing holder, a rotating handle pivoted with the fixing holder, two ratchet wheels mounted on two ends of the first rotary shaft, and at least one stopping piece disposed on the fixing holder and pushed to retain with the two ratchet wheels to generate a single-direction stopping function, with the rotating handle having a pushing plate retained with the two ratchet wheels by rotating the rotating handle to rotate the two ratchet wheels and the first rotary shaft, with the first rotary shaft having two driving gears fixed on two ends thereof;
a reel including a seat movably coupled with the body, a second rotary shaft inserted through the seat, two driven gears meshing with the two driving gears, and one of a chain roller and a steel cable roller mounted on the seat;
with the body including a first connecting portion with plural holes, with the seat having a second connecting portion disposed thereon and having a plurality of apertures defined on the second connecting portion thereof, with the reel and the body being movably coupled together, with the second connecting portion of the reel being aligned and overlapped with the first connecting portion of the body; and
at least one pin inserted into at least one of the plural holes of the first connecting portion and the plurality of apertures of the second connecting portion.

2. The hand puller with the rope reel as claimed in claim 1, wherein two stopping pieces are disposed on the fixing holder of the body.

3. The hand puller with the rope reel as claimed in claim 1, wherein the two ratchet wheels are mounted on the two ends of the first rotary shaft outside the fixing holder.

4. The hand puller with the rope reel as claimed in claim 1, wherein the two driven gears are secured on two ends of the second rotary shaft outside the seat.

5. The hand puller with the rope reel as claimed in claim 1, wherein the chain roller or the steel cable roller is secured on the second rotary shaft inside the seat.

6. The hand puller with the rope reel as claimed in claim 1, wherein the seat of the reel also has a guiding device so that a chain aligns with the guiding device.

* * * * *